(12) United States Patent
Biedasek et al.

(10) Patent No.: US 9,139,692 B2
(45) Date of Patent: Sep. 22, 2015

(54) PROCESS FOR POLYMERIZING LACTAM

(75) Inventors: Silke Biedasek, Mannheim (DE);
Philippe Desbois,
Edingen-Neckarhausen (DE);
Mohammed Abboud, Rothschild, WI
(US); Andreas Wollny, Ludwigshafen
(DE)

(73) Assignee: BASF SE, Ludwigshafen (DE)

( * ) Notice: Subject to any disclaimer, the term of this patent is extended or adjusted under 35 U.S.C. 154(b) by 359 days.

(21) Appl. No.: 13/308,845

(22) Filed: Dec. 1, 2011

(65) Prior Publication Data

US 2012/0141791 A1    Jun. 7, 2012

Related U.S. Application Data

(60) Provisional application No. 61/419,260, filed on Dec. 3, 2010.

(51) Int. Cl.
| | | |
|---|---|---|
| *C08G 69/18* | (2006.01) | |
| *C08G 69/20* | (2006.01) | |
| *C08G 69/46* | (2006.01) | |
| *C08L 77/02* | (2006.01) | |
| *C09D 177/02* | (2006.01) | |
| *B29B 15/12* | (2006.01) | |
| *C08G 18/80* | (2006.01) | |
| *C08G 69/14* | (2006.01) | |

(52) U.S. Cl.
CPC ............. *C08G 69/18* (2013.01); *C08G 69/20* (2013.01); *C08G 69/46* (2013.01); *C08L 77/02* (2013.01); *C09D 177/02* (2013.01); *B29B 15/127* (2013.01); *C08G 18/8074* (2013.01); *C08G 69/14* (2013.01); *Y10T 428/2982* (2015.01)

(58) Field of Classification Search
CPC ... C08G 18/8074; C08G 69/14; B29B 15/127
USPC .................................................. 528/315, 323
See application file for complete search history.

(56) References Cited

U.S. PATENT DOCUMENTS

| | | | |
|---|---|---|---|
| 3,325,455 A | | 6/1967 | Warner |
| 4,022,719 A | * | 5/1977 | Okuyama et al. ............. 521/125 |
| 4,582,879 A | * | 4/1986 | Frisch et al. .................. 525/424 |
| 5,269,980 A | | 12/1993 | Levendis et al. |
| 6,150,477 A | * | 11/2000 | Engelhardt et al. ............. 526/88 |
| 8,883,939 B2 | * | 11/2014 | Abboud et al. ................. 526/64 |
| 2009/0306332 A1 | * | 12/2009 | Kray et al. .................... 528/323 |
| 2011/0294968 A1 | * | 12/2011 | Abboud et al. ................. 526/64 |

FOREIGN PATENT DOCUMENTS

| | | |
|---|---|---|
| DE | 1 420 241 | 2/1969 |
| DE | 43 08 842 A1 | 9/1994 |
| DE | 10 2005 048 698 A1 | 4/2007 |
| WO | WO 2005/111088 A1 | 11/2005 |
| WO | WO 2006/024368 A1 | 3/2006 |
| WO | WO 2010/031705 A1 | 3/2010 |
| WO | WO 2010/086433 A1 | 8/2010 |

OTHER PUBLICATIONS

U.S. Appl. No. 13/308,707, filed Dec. 1, 2011, Desbois, et al.
U.S. Appl. No. 13/454,320, filed Apr. 24, 2012, Desbois, et al.

\* cited by examiner

*Primary Examiner* — Gregory Listvoyb
(74) *Attorney, Agent, or Firm* — Oblon, McClelland, Maier & Neustadt, L.L.P.

(57) ABSTRACT

The present invention relates to a novel process for the anionic polymerization of lactam monomers.

19 Claims, No Drawings

PROCESS FOR POLYMERIZING LACTAM

CROSS-REFERENCE TO RELATED APPLICATIONS

This application is based upon and claims the benefit of priority to U.S. Provisional Application No. 61/419,260 filed on Dec. 3, 2010.

BACKGROUND OF THE INVENTION

The present invention relates to a novel process for the anionic polymerization of lactam monomers.

It is known that anionic polymerization of lactam monomers can produce polyamides.

DE-A-14 20 241 discloses by way of example a process for producing linear polyamide chains via addition of KOH as catalyst and 1,6-bis(N,N-dibutylureido)hexane as activator by what is known as anionic polymerization of lactams.

The activated anionic polymerization of lactams is disclosed in Polyamide, Kunststoff Handbuch [Polyamides, Plastics handbook] vol. 3/4, ISBN 3-446-16486-3, 1998, Carl Hanser Verlag, 49-52, in which the use of Na caprolactamate as catalyst is described in combination with acyl lactam derivatives for producing linear polyamides.

The activated anionic polymerization of lactams is also disclosed in Macromolecules, vol. 32, No. 23 (1999), page 7726, which describes the use of sodium caprolactamate as catalyst in combination with N,N'-hexamethylenebis(2-oxo-1-azepanylcarboxamide) for producing linear polyamides.

Spray polymerization is a known process which has been repeatedly described in the prior art. By way of example, WO 2005/111088 A1 and WO 2006/024368 A1 describe the free-radical spray polymerization of monomers such as acrylic acid, the aim being to produce water-swellable polymer particles ("superabsorbers" or superabsorbent polymers, SAP) or polymeric thickeners. DE 10 2005 048 698 A1 concerns the spray polymerization of isobutene to give polyisobutene (PIB).

U.S. Pat. No. 3,325,455 "Method of producing nylon powders" describes a process for producing polylactam powders via polymerization of monomer droplets. Here, the reactive mixture is produced in a heated stirred container via mixing of lactam monomer, activator, and catalyst. Said mixture is conveyed by means of a pump and sprayed by means of a nozzle into a reaction vessel, which has an inert gas supply. The gas temperature is selected here in such a way as to cause immediate initiation of the polymerization reaction.

In U.S. Pat. No. 3,325,455, the components are initially mixed batchwise in a stirred container before being sprayed continuously. A consequence of the only partially continuous procedure according to said disclosure, however, is either that the amount of reaction mixture that can be ready for use at any time is only very small or that, if relatively large amounts of mixture are used, there is a distribution of residence times in the feed vessel, and this causes a rise in the conversion of the reaction mixture during the spraying process, making it impossible to achieve a stationary state in the process. In addition, the reaction mixture already begins to polymerize in the feed vessel at the temperatures of 150° C. used, at least at relatively high catalyst concentrations. Molecular weight Mw and molecular weight distribution therefore change over time, as also does viscosity and therefore particle size. The shape and properties of the resultant polyamide powder therefore change over the course of time.

WO 2010/031705 A1 discloses a process for producing polymer particles via free-radical emulsion polymerization.

WO 2010/086433 A describes a process for anionic polymerization in an oil phase; however, the product comprises a certain proportion of oil.

Furthermore, the processes described in the prior art often require acceptance of relatively high monomer losses, and therefore relatively low polymer yield.

It is therefore an object to provide a process for the anionic polymerization of lactam monomers which avoids the abovementioned disadvantages. The intention was therefore to provide a process which gives polyamide particles with consistent product properties (such as viscosity and degree of crosslinking); the intention was furthermore that the process provide maximum product yield and a defined particle size and particle size distribution. The level of contamination in the resultant polyamide particles should moreover be minimized.

The abovementioned object was achieved via the process of the invention, as defined in the claims.

The present invention therefore provides a process for producing polyamide particles via anionic polymerization of at least one lactam with the use of at least one catalyst and of at least one activator, where discrete droplets of the reaction mixture are introduced into a surrounding gas phase and are reacted.

For the purposes of this invention, the expression "polyamide particles" refers to approximately spherical particles with an average diameter of from 1 to 2000 μm. The particles can be porous particles and/or can be particles comprising liquid.

In one embodiment of the process of the invention, precisely one lactam monomer is used.

In one embodiment of the process of the invention, precisely one catalyst is used.

In one particularly preferred embodiment, precisely one activator is used.

In the process of the invention, the introduction and mixing of the individual components, and therefore the production of the reactive mixture takes place continuously, in contrast to conventional processes. This leads to stationary-state process conditions with consistent product properties, and to significantly higher operating time for the process.

The process of the invention therefore differs from U.S. Pat. No. 3,325,455 at least in the nature of the production process for the reactive mixture.

In the invention, the lactam monomer (e.g. ε-caprolactam), at least one catalyst, and at least one activator are preferably provided, separately from one another, for use in the form of melt. All of the components are continuously conveyed and mixed.

The catalyst and the activator can also respectively take the form of solution in the lactam monomer; however it is important that catalyst and activator are provided separately from one another for use.

In one embodiment of the invention, the activator is first admixed with the lactam stream, and the catalyst is subsequently incorporated by mixing into said mixture. A reactive mixture is produced only on addition of the catalyst. The mixture is by way of example converted into discrete droplets via spraying through a nozzle or through a dropletizer into a reactor which has a supply of hot inert gas (e.g. spray tower). As the droplets fall within the reactor, the anionic polymerization of the lactam takes place, as therefore also does the production of polyamide. Polyamide particles are obtained at the outlet.

In another embodiment of the invention, the sequence of mixing to incorporate the activator and to incorporate the catalyst can also be reversed.

The feed vessels and feed lines generally have temperature-control, to a temperature from the melting point of the monomer used to the reaction temperature prevailing within the reactor, e.g. in a tower reactor. However, prior to production of the reactive mixture, it is also possible for the monomer feed to be adjusted to temperatures of up to 50 K above the gas temperature within the reactor.

The term "reactive" is used below for a mixture which respectively comprises at least one lactam monomer, at least one catalyst, and at least one activator.

The conversion in the reaction prior to conversion to the droplet form can be adjusted to from 0 to 50%, preferably from 0 to 30%, by way of the residence time between the point of incorporation by mixing, from which the reactive mixture is present, and the nozzle, and also by way of the temperature profile in the residence-time section.

After the process of the invention has ended, conversion does not have to be complete. It is preferable that the conversion at the end of the process of the invention is in the range from 50 to 100%, particularly preferably from 90 to 100%.

An example of a suitable lactam is caprolactam, piperidone, pyrrolidone, laurolactam, or a mixture of these, preferably caprolactam, laurolactam, or a mixture of these, particularly preferably caprolactam or laurolactam. It is moreover also possible to use a mixture of lactam monomer(s) with one or more cyclic lactones, e.g. caprolactone.

In one preferred embodiment of the process of the invention, at least one lactam has been selected from the group comprising caprolactam, laurolactam, or a mixture of these.

Suitable activators are inter alia aliphatic diisocyanates, such as butylene diisocyanate, hexamethylene diisocyanate (HDI), octamethylene diisocyanate, decamethylene diisocyanate, undecamethylene diisocyanate, dodecamethylene diisocyanate, isophorone diisocyanate, 4,4'-methylenebis(cyclohexyl isocyanate), and also aromatic diisocyanates, such as tolylene diisocyanate, 4,4'-methylenebis(phenyl isocyanate), or polyisocyanates, such as isocyanurates of hexamethylene diisocyanate, Basonat® HI 100 from BASF SE, allophanates, such as ethyl allophanate, or a mixture of these, preferably hexamethylene diisocyanate or isophorone diisocyanate, and particularly preferably hexamethylene diisocyanate. The diisocyanates can be replaced by monoisocyanates.

Compounds alternatively suitable as activators are diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, isophoronedioyl chloride, isophoronedioyl bromide, 4,4'-methylenebis(cyclohexyl)oyl chloride, 4,4'-methylenebis(cyclohexyl)oyl bromide, and also aromatic diacyl halides such as tolylenedioyl chloride, tolylenemethylenedioyl bromide, 4,4'-methylenebis(phenyl)oyl chloride, 4,4'-methylenebis(phenyl)oyl bromide, or a mixture of these, preferably hexamethylenedioyl chloride, hexamethylenedioyl bromide, or a mixture of these, particularly preferably hexamethylenedioyl chloride. The diacyl halides can be replaced by monoacyl halides. Brüggolen® C20 (a solution of HDI in caprolactam) is a preferred activator.

In one preferred embodiment of the process of the invention, at least one activator has been selected from the group comprising hexamethylene diisocyanate (HDI) and isophorone diisocyanate.

In another preferred embodiment of the process of the invention, the activator is lactam-capped HDI.

A suitable catalyst is inter alia sodium caprolactamate, potassium caprolactamate, magnesium bromide caprolactamate, magnesium chloride caprolactamate, magnesium biscaprolactamate, sodium hydrides, sodium metal, sodium hydroxide, sodium methoxide, sodium ethoxide, sodium propoxide, sodium butoxide, sodium hydride, potassium metal, potassium hydroxide, potassium methoxide, potassium ethoxide, potassium propoxide, potassium butoxide, preferably sodium hydrides, sodium metal, sodium caprolactamate, and particularly preferably sodium caprolactamate (Brüggolen® C 10, a solution made of 18% by weight of sodium caprolactamate in caprolactam).

In one preferred embodiment of the process of the invention, at least one catalyst has been selected from the group comprising sodium hydrides, sodium metal, and sodium caprolactamate.

The molar ratio of lactam to the catalyst can vary widely, but is generally from 1:1 to 10 000:1, preferably from 10:1 to 1000:1, particularly preferably from 50:1 to 300:1.

The molar ratio of activator to the catalyst can vary widely, but is generally from 100:1 to 1:10 000, preferably from 10:1 to 1:100, particularly preferably from 1:1 to 1:10.

The polymerization reaction can also be carried out in the presence of crosslinking agents.

The polymerization can also be carried out in the presence of other additives, such as fillers (preferably inorganic fillers) or polymers (for example soluble polymers acting as thickeners), with average particle diameter smaller than 50 μm. Blowing agents can also be used, examples being chemical or physical blowing agents; blowing agents used here can be those with vaporization temperature below the reaction temperature, or else blowing agents with vaporization temperature above the reaction temperature.

The reaction is preferably carried out in apparatuses which are suitable for the spray-drying process. Apparatuses of this type are described by way of example in K. Masters, Spray Drying Handbook, 5th edition, Longman, 1991, pp. 23-66.

The process of the invention can use one or more spray nozzles. The spray nozzles that can be used are not subject to any restriction. The liquid to be sprayed can be introduced under pressure into these spray nozzles. The comminution of the liquid to be sprayed can be achieved by depressurizing it in the orifice of the nozzle after it has reached a certain minimum velocity. It is also possible to use single-flow nozzles for the purposes of the invention, examples being slot nozzles, or centrifugal chambers (solid-cone nozzles) (for example from Düsen-Schlick GmbH, DE, or from Spraying Systems Deutschland GmbH, DE).

Throughput per spray nozzle is advantageously from 0.1 to 10 $m^3$/h, frequently from 0.5 to 5 $m^3$/h.

The reaction can also be carried out in apparatuses in which the monomer solution can be subjected to free fall in the form of monodisperse droplets. Apparatuses such as those described in U.S. Pat. No. 5,269,980 are suitable for this purpose.

It is equally possible to produce droplets via laminar breakdown of a jet, as described in Rev. Sci. Instr. 38 (1966) 502.

However, the droplets can also be produced by means of pneumatic drawing dies, rotation, section of a jet, or rapid-response microvalve dies.

In a pneumatic drawing die, a jet of liquid is accelerated together with a gas stream through an aperture. The diameter of the jet of liquid, and thus the diameter of the droplets, can be influenced by way of the amount of gas used.

In the case of droplet production via rotation, the liquid passes through the openings in a rotating disc. The centrifugal force acting on the liquid disentrains droplets of defined size.

Preferred apparatuses for rotation dropletization are described by way of example in DE 43 08 842 A1.

However, it is also possible to use a rotating blade to section the emerging jet of liquid into defined segments. Each segment then forms a droplet.

When microvalve dies are used, droplets are provided directly with defined liquid volume.

The average diameter of the discrete droplets produced is generally from 1 to 2000 µm, preferably from 10 to 1000 µm, particularly preferably from 10 to 500 µm, very particularly preferably from 100 to 200 µm, where the diameter of the droplets can be determined by light scattering, and is the volume-average diameter.

A gas can pass through the polymerization reactor. The carrier gas here can be conducted through the reaction space concurrently or countercurrently with respect to the monomer solution droplets that are in free fall, preferably cocurrently, i.e. downward. It is preferable that, after passage of the gas, it is at least to some extent returned to the reaction space, preferably to an extent of at least 50%, particularly preferably to an extent of at least 75%, in the form of a gas circuit. A portion of the carrier gas is usually discharged after each pass, preferably up to 10%, particularly preferably up to 3%, very particularly preferably up to 1%.

The oxygen content of the carrier gas is preferably at most 15% by volume, particularly preferably at most 5% by volume, very particularly preferably at most 0.1% by volume.

The carrier gas preferably comprises, alongside oxygen, an inert gas, particularly preferably nitrogen. The inert gas content of the carrier gas is preferably at least 80% by volume, particularly preferably at least 90% by volume, very particularly preferably at least 95% by volume.

In a further embodiment, a lactam monomer is charged to the carrier gas. The lactam content in the gas phase of the reactor is then preferably at least 50%, particularly preferably at least 75% and very particularly preferably at least 90%, of the saturation concentration at the prevailing gas phase temperature in the reactor tower.

In a further embodiment of the process of the invention, the relative concentration of the lactam monomers in the gas phase of the reactors is from 50% to 100%, preferably from 60% to 100%, particularly preferably from 80% to 100%, of the saturation concentration appropriate to the prevailing gas temperature.

The gas velocity is preferably adjusted in such a way that the flow within the polymerization reactor is oriented flow, where for example there are no convection vortices opposed to the general direction of flow, and this velocity is by way of example from 0.01 to 5 m/s, preferably from 0.02 to 4 m/s, particularly preferably from 0.05 to 3 m/s, very particularly preferably from 0.1 to 2 m/s.

The gas that passes through the reactor is advantageously preheated, prior to the reactor, to the reaction temperature.

The gas inlet temperature, i.e. the temperature at which the gas enters the reaction space, is preferably from 120 to 250° C., particularly preferably from 140 to 200° C., very particularly preferably from 150 to 170° C.

In one preferred embodiment of the process of the invention, the internal temperature of the reactor is from 130 to 170° C.

The reaction can be carried out at superatmospheric pressure or at subatmospheric pressure, preference being given to a superatmospheric pressure of up to 100 mbar relative to ambient pressure.

The reactors can have ancillary heating. The ancillary heating here is adjusted in such a way that the wall temperature is at least 5° C. above the internal temperature of the reactor, and that condensation on the walls of the reactor is reliably avoided.

Posttreatment can also be carried out, e.g. in a fluidized bed. This gives a longer residence time for the reaction mixture within the reactor; conversion can thus generally be further increased.

The abovementioned posttreatment is preferably carried out with flushing by inert gas, particularly preferably nitrogen, at temperatures of from 120-170° C.

The resultant polyamide particles can also be subjected to extraction, e.g. by using aqueous extraction processes. The properties of the polyamide particles can be further improved via contact with water.

The intrinsic viscosity (IV) of the polyamides obtained by the process of the invention is generally from 20 to 1000, preferably from 50 to 800, particularly preferably from 80 to 500. In another preferred embodiment of the process of the invention, crosslinked polyamide particles are obtained.

The present invention therefore further provides polymer particles obtainable by the process of the invention.

The process of the invention can produce, inter alia, crosslinked polyamides derived from any desired polyamides, examples being nylon-3, nylon-4, nylon-5, nylon-6, nylon-7, nylon-8, nylon-9, nylon-10, nylon-11, nylon-12, nylon-13, nylon-14, nylon-15, nylon-16, nylon-17, and nylon-18, and copolyamides, such as nylon-4/6, nylon-5/6, nylon-4/5, nylon-6/7, nylon-6/8, nylon-6/9, nylon-6/10, nylon-6/12, nylon-4/12, nylon-4/10, nylon-5/10, nylon-5/12, preferably nylon-6, nylon-12, nylon-4/6, nylon-5/6, nylon-4/12, nylon-5/12, particularly preferably nylon-6, and nylon-12, in particular nylon-6.

The polyamide particles that can be produced by the process of the invention can be used inter alia for extruded films, or for filaments, standard injection-molding applications, laser sintering, flame spraying, powder coating, rotomolding, organopanels, and/or cosmetics.

The present invention therefore further provides the use, in the abovementioned applications, of the polyamide particles that can be produced by the process of the invention.

EXAMPLES

The examples below serve to illustrate certain aspects of the present invention. The examples are certainly not intended to be regarded as restricting the scope of the invention.

Intrinsic viscosity (IV) was determined to ISO 307 (at C=5 g/l in 96% strength sulfuric acid).

Example 1

ε-Caprolactam conveyed at a rate of 8.44 kg/h was mixed continuously at 85° C. in a static mixer with a solution composed of 95.2 percent by weight of ε-caprolactam and 4.8 percent by weight of sodium caprolactamate, where the conveying rate for addition of this solution was 4.25 kg/h. The temperature of this mixture was controlled to 110° C. 0.55 kg/h of a solution composed of 80 percent by weight of N,N'-hexamethylenebis(carbamoyl-ε-caprolactam) and 20 percent by weight of caprolactam was added, continuously, and then the resultant mixture was sprayed by means of a twin-fluid nozzle into a spray tower inertized with nitrogen. ε-Caprolactam saturated the gas phase here. The temperature of the gas phase in the spray tower was 180° C. Spherical polyamide particles were obtained with an average particle size of 160 μm and with intrinsic viscosity 220 ml/g.

Example 2

ε-Caprolactam conveyed at a rate of 8.68 kg/h was mixed continuously at 85° C. in a static mixer with a solution composed of 90.8 percent by weight of ε-caprolactam and 9.2 percent by weight of sodium caprolactamate, where the conveying rate for addition of this solution was 2.71 kg/h. The temperature of this mixture was controlled to 160° C. 0.61 kg/h of a solution composed of 80 percent by weight of N,N'-hexamethylenebis(carbamoyl-ε-caprolactam) and 20 percent by weight of caprolactam was added, continuously, and then the resultant mixture was sprayed by means of a twin-fluid nozzle into a spray tower inertized with nitrogen. ε-Caprolactam saturated the gas phase here. The temperature of the gas phase in the spray tower was 140° C. Spherical polyamide particles were obtained with an average particle size of 160 μm and with intrinsic viscosity 160 ml/g.

The polyamide particles obtained from the two examples had ideal flowability.

The invention claimed is:

1. A process for producing polyamide particles, the process comprising:
 anionically polymerizing a lactam in the presence of a catalyst and an activator by introducing discrete droplets of a reaction mixture comprising the lactam, the catalyst, and the activator into a surrounding gas phase within a reactor, and reacting said reaction mixture to form polyamide particles,
 wherein the introducing and mixing of the lactam, the catalyst, and the activator occurs continuously, such that:
  the activator is first continuously admixed with a lactam stream to form an activator mixture, the catalyst is then continuously incorporated into the activated mixture by mixing to form the reactive mixture, and the reactive mixture is then continuously sprayed into the reactor; or
  the catalyst is first continuously admixed with a lactam stream to form a catalyst mixture, the activator is then continuously incorporated into the catalyst mixture by mixing to form the reactive mixture, and the reactive mixture is then continuously sprayed into the reactor, and
 wherein the introducing of the lactam, the catalyst, and the activator into the reactor is carried out by spraying the mixture of the lactam, the catalyst, and the activator through spray nozzles at a rate of from 0.1 to 10 m³/h, and wherein at least 90% of the total amount of reactive lactam monomer reacts to form the polyamide particles by the end of said anionically polymerizing.

2. The process according to claim 1, wherein the lactam is at least one selected from the group consisting of caprolactam, and laurolactam.

3. The process according to claim 1, wherein the catalyst is at least one selected from the group consisting of a sodium hydride, sodium metal, and sodium caprolactamate.

4. The process according to claim 1, wherein the activator is at least one selected from the group consisting of hexamethylene diisocyanate, and isophorone diisocyanate.

5. The process according to claim 1, wherein the activator is lactam-capped HDI.

6. The process according to claim 1, wherein a molar ratio of the lactam to the catalyst is from 1:1 to 10 000:1.

7. The process according to claim 1, wherein a molar ratio of the activator to the catalyst is from 100:1 to 1:10 000.

8. The process according to claim 1, wherein a feed vessel comprising starting components has a temperature between a melting point of a lactam monomer and a reaction temperature within a reactor.

9. The process according to claim 1, further comprising:
 prior to producing the reaction mixture, adjusting a monomer feed to a temperature of up to 50 K above a gas temperature within the reactor.

10. The process according to claim 1, wherein a relative concentration of a lactam monomer in the gas phase within the reactor is from 50% to 100% of a saturation concentration for a prevailing gas temperature.

11. The process according to claim 1, wherein an internal temperature of the reactor is from 130-170° C.

12. The process according to claim 1, wherein an average diameter of polyamide particles is from 1 to 2000 μm.

13. The process according to claim 1, wherein a conversion rate, prior to formation of the discrete droplets, is from 0 to 50%.

14. The process according to claim 1, further comprising: adding an additive to the reaction mixture.

15. The process according to claim 1, further comprising: post-treating the polyamide particles in a fluidized bed, to thereby increase conversion.

16. The process according to claim 15, wherein the post-treatment occurs with flushing by an inert gas at a temperature of from 120-170° C.

17. A particulate polyamide material, comprising polyamide particles produced by the process of claim 1.

18. An article, comprising polyamide particles produced by the process of claim 1, wherein the article is selected from the group consisting of an extruded film, a filament, a laser sintering, a powder coating, a rotomolding, an organopanel, a cosmetic, and a combination thereof.

19. The process according to claim 1, wherein the polyamide particles obtained from said anionically polymerizing have average diameter of from 1 to 2,000 μm, and the average diameter is within this range over the entire course of said anionically polymerizing.

* * * * *